(12) United States Patent
Reses

(10) Patent No.: US 11,538,105 B2
(45) Date of Patent: Dec. 27, 2022

(54) CRYPTOGRAPHIC-ASSET COLLATERAL MANAGEMENT

(71) Applicant: Block, Inc., San Francisco, CA (US)

(72) Inventor: Jacqueline Reses, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 177 days.

(21) Appl. No.: 17/001,385

(22) Filed: Aug. 24, 2020

(65) Prior Publication Data

US 2022/0058732 A1   Feb. 24, 2022

(51) Int. Cl.
| | |
|---|---|
| *G06Q 40/02* | (2012.01) |
| *G06Q 20/06* | (2012.01) |
| *G06Q 20/38* | (2012.01) |
| *H04L 9/06* | (2006.01) |
| *H04L 9/08* | (2006.01) |
| *H04L 9/32* | (2006.01) |
| *H04L 67/133* | (2022.01) |
| *H04L 9/00* | (2022.01) |

(52) U.S. Cl.
CPC ......... *G06Q 40/025* (2013.01); *G06Q 20/065* (2013.01); *G06Q 20/38215* (2013.01); *H04L 9/0637* (2013.01); *H04L 9/0825* (2013.01); *H04L 9/3213* (2013.01); *H04L 67/133* (2022.05); *G06Q 2220/00* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | |
|---|---|---|---|
| 10,536,537 B1 * | 1/2020 | Le | H04L 9/3239 |
| 11,139,955 B1 * | 10/2021 | So | G06Q 20/3674 |
| 2018/0075421 A1 * | 3/2018 | Serrano | G06Q 40/025 |
| 2018/0365764 A1 * | 12/2018 | Nelson | H04L 9/0637 |
| 2019/0164221 A1 * | 5/2019 | Hill | G06Q 20/3825 |
| 2020/0294133 A1 * | 9/2020 | Celia | G06Q 40/025 |
| 2021/0035098 A1 | 2/2021 | Long et al. | |
| 2021/0037076 A1 | 2/2021 | Long et al. | |
| 2021/0050994 A1 | 2/2021 | Leddy | |
| 2021/0065300 A1 | 3/2021 | Leshner et al. | |
| 2021/0065302 A1 | 3/2021 | Leshner et al. | |
| 2021/0073913 A1 | 3/2021 | Ingargiola | |

(Continued)

OTHER PUBLICATIONS

Patel, Byzantine Fault Tolerance (BFT) and its significance in Blockchain world, HCL Blogs, Jan. 24, 2020, entire document pertinent. Retrieved Apr. 11, 2022 from https://www.hcltech.com/blogs/byzantine-fault-tolerance-bft-and-its-significance-blockchain-world (Year: 2020).*

(Continued)

*Primary Examiner* — Gregory S Cunningham, II
(74) *Attorney, Agent, or Firm* — Baker Botts L.L.P.

(57) ABSTRACT

Provided is a process, including for lending, with a smart contract executable by a decentralized computing platform, money to a borrower. The process includes securing, with the smart contract, the loan by obtaining control of cryptocurrency of the borrower and monitoring, via the smart contract, whether the cryptocurrency satisfies a loan-to-value threshold. In response to the monitoring, an amount of cryptocurrency secured with the loan can be adjusted.

20 Claims, 6 Drawing Sheets

(56) References Cited

U.S. PATENT DOCUMENTS

2021/0082044 A1* 3/2021 Sliwka ............... G06Q 10/103
2021/0390549 A1* 12/2021 Rule ................... G06Q 20/403

OTHER PUBLICATIONS

Brammer, et al., Lender Considerations for Cryptocurrency and Other Digital Assets, 2019, retrieved from https://frostbrowntodd.com/lender-considerations-for-cryptocurrency-and-other-digital-assets/#page=1 (Year: 2019).*

Lin HY., Tzeng WG. (2005) An Efficient Solution to the Millionaires' Problem Based on Homomorphic Encryption. In: Ioannidis J., Keromytis A., Yung M. (eds) Applied Cryptography and Network Security. ACNS 2005. Lecture Notes in Computer Science, vol. 3531. Springer, Berlin, Heidelberg, https://doi.org/10.1007/11496137_31 (12 pages).

I. Ioannidis and A. Grama, "An efficient protocol for Yao's millionaires' problem," 36th Annual Hawaii International Conference on System Sciences, 2003. Proceedings of the, Big Island, HI, USA, 2003, pp. 6 pp.-, doi: 10.1109/HICSS.2003.1174464 (4 pages).

"Blog: Multiplicative vs Additive Homomorphic ElGamal," nVotes, Jan. 1, 2020, https://nvotes.com/multiplicative-vs-additive-homomorphic-elgamal/ (1 page).

Mann, Ronald J., "Reliable Perfection of Security Interests in Crypto-Currency," 21 SMU Sci. & Tech. L. Rev. 159 (2018) [ 22 pages, 159 to 180 ].

"View of Formalizing and Securing Relationships on Public Networks," https://journals.uic.edu/ojs/index.php/fm/article/view/548/469 Jul. 23, 2020 (1 page).

A. C. Yao, "Protocols for secure computations," 23rd Annual Symposium on Foundations of Computer Science (sfcs 1982), Chicago, IL, USA, 1982, pp. 160-164, doi: 10.1109/SFCS.1982.38.

Jones, Jason, "Why Decentralized Lending Today is Like the Early Days of P2P Lending," https://www.lendacademy.com/why-decentralized-lending-today-is-like-the-early-days-of-p2p-lending/ May 13, 2020 (11 pages).

Internet Archive of "Proof of Stake FAQ," https://github.com/ethereum/wiki/wiki/Proof-of-Stake-FAQ Jun. 9, 2020 (23 pages).

Ng, Jackson, "Escrow Service as a Smart Contract: The Business Logic," https://medium.com/coinmonks/escrow-service-as-a-smart-contract-the-business-logic-5b678ebe195519 May 2018 (11 pages).

"Blockchain-Based Lending," Consensys, https://media.consensys.net/blockchain-based-lending-1eee5edabe8a Jul. 11, 2018 (10 pages).

Law H.H., "Blockchain and the Future of Secured Transactions Law,"Stanford Journal of Blockchain Law & Policy [Internet]. Jan. 5, 2020; https://stanford-jblp.pubpub.org/pub/blockchain-secured-transactions.

* cited by examiner

CRYPTOGRAPHIC-ASSET COLLATERAL MANAGEMENT

BACKGROUND

Virtual currencies, like cryptocurrencies, have generated enormous interest since the publication of the Bitcoin whitepaper in 2008. Bitcoin and other cryptocurrencies (and other types of cryptographic assets) have facilitated transactions worldwide, often in jurisdictions where commerce would otherwise be challenging, like those with less-developed financial markets and less-robust support for the rule of law. And even in jurisdictions that are more favorable for commerce, use of cryptocurrencies has expanded to facilitate transactions with greater privacy and lower transaction costs than would otherwise be available in some cases. Indeed, it is expected that the importance of cryptocurrencies will only increase, as the related technical, legal, and social infrastructure matures.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
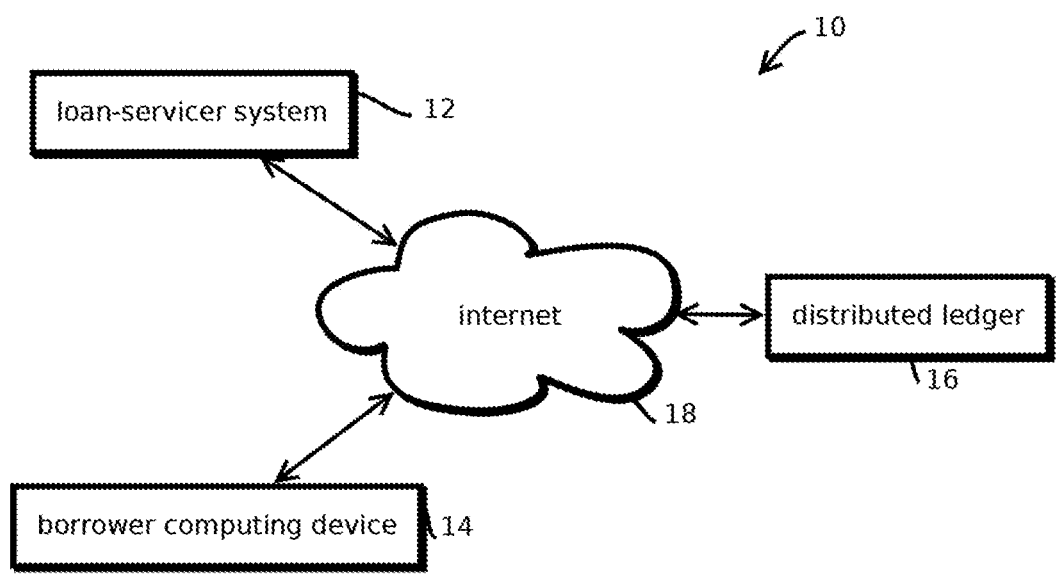
FIG. 1 is a block diagram of an example of a computing environment in which cryptocurrency collateral may be managed, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent technical solutions and, in some cases just as importantly, recognize technical problems overlooked (or not yet foreseen) by others in the fields of fintech, cryptography, and decentralized systems and applications. Indeed, the inventors wish to emphasize the difficulty of recognizing those problems that are nascent and will become much more apparent in the future should trends in industry continue as expected. Further, because multiple problems are addressed, it should be understood that some embodiments are problem-specific, and not all embodiments address every problem with traditional systems described herein. That said, improvements that solve various permutations of these problems are described below.

Holders of virtual assets (like virtual cryptographic assets, such as digital assets rendered rivalrous with distributed ledger technology) often find it difficult to borrow against those assets, using them as collateral. This issue is particularly acute in the realm of cryptocurrency, given the relatively substantial amount of stored value that has accrued. For a variety of reasons, users may want to pledge cryptocurrency (or other virtual cryptographic assets, like utility tokens) as security against various types of obligations, like promissory notes or promises to perform some service. Secured loans can be preferred over outright sales of the virtual cryptographic assets for a variety of reasons. For instance, often asset-owners wish to retain ownership of the virtual cryptographic assets to avoid tax consequences of a sale or to maintain exposure to price changes in the assets and participate in appreciation.

Challenges arise when attempting to borrow against virtual cryptographic assets using many forms of distributed ledger technology. (Much of the discussion that follows is with reference to cryptocurrency, but it should be appreciated that similar approaches are contemplated for other types of virtual cryptographic assets, like utility tokens, nonfungible cryptographic assets (e.g., ERC-721 tokens), and the like.) One challenge is volatility of the price of cryptocurrency. Many types of cryptocurrency fluctuate in value relative to other assets, like government-issued currency, such as the US dollar, or stable coin cryptocurrencies pegged to the value of one or more forms of government-issued currency. Often, these fluctuations are relatively large compared to what is experienced in more typical lending practices. A concern is that a downward fluctuation could leave cryptocurrency collateral worth substantially less than the obligation being secured, reducing (or even eliminating) the lender's protection from default. As a result, many lenders have been unwilling to lend against cryptocurrency (e.g., with the cryptocurrency securing the obligation to repay) because existing forms of distributed ledger technology often do not provide sufficient tools and functionality to manage that volatility over the life of the loan. Further, many forms of distributed ledger technology impose more latency on, and offer less bandwidth to process, transactions than would be preferable, particularly if such systems were ever tasked with processing a material portion of (e.g., more than 2% of) more established forms of off-chain transactions, like credit card transactions. For instance, it has been estimated that the Bitcoin network can process around 7 transactions per second, while credit card transactions are estimated to occur at closer to a rate of 5,000 per second.

Another challenge with lending against cryptocurrency arises from the failure of many existing computer systems to accommodate the legal background governing how security interests are perfected. Perfecting a security interest may include creating records that are legally recognized as putting others on notice that the security interest exists, to prevent others from later lending against the same asset and taking a superior position in the event of default (e.g., being ahead in line to be compensated by sale of the collateral upon default when multiple lenders have taken security interests in the collateral).

The form this notice takes is often specified by the Uniform Commercial Code (UCC). A number of scholars of the same have taken the position that, under the UCC, many forms of cryptocurrency qualify as "general intangibles," placing them in the same category as commercial tort claims, deposit accounts, letters of credit, and other rights recoverable with legal claims. A consequence of this classification, under the UCC, is that perfection typically involves recording a financing statement (e.g., a UCC-1 form) with a governmental entity in the grantor's (e.g., the lender's or guarantor's) home state to put junior lean holders on notice. Further, ensuring that a senior lien does not currently exist, before agreeing to lend against the asset, often involves searching public records for such statements. Complicating the process even further, security interests can run with the asset in some cases, meaning that a unit of cryptocurrency could be burdened by a security interest granted by previous owner in some cases.

The technical complexities of accurately checking for senior liens and perfecting through filing financing statements has deterred many from lending against cryptocurrencies, as many existing forms of distributed ledger technology are not well suited to mitigate the risks otherwise addressed by (or created by) these processes. Among other issues is the "oracle problem," which is a long-felt problem in the realm of distributed ledger technology. The problem arises from the security and authenticity of data from third-party oracles (e.g., sources of data making assertions upon which smart contract logic flow branches) and the trustless execution of some forms of smart contracts. Some users prefer to reduce the number of entities upon which trust is placed, and this preference, in some cases, can be frustrated by use of external (e.g., off-chain) datasets for things like data from financing statements from a government entity. Users may not trust the external data or that the data was not subject to tampering while at rest or in flight, and many existing distributed ledger architectures are not lack technical features to mitigate this concern. Other challenges arise from interfacing with a diverse set of data sources from different governmental entities (e.g., possibly more than a thousand different recording offices), some of which may not expose an application program interface by which remote systems can interrogate an authoritative database of financing statements.

Another challenge lenders face arises from some of the very strengths of some forms of distributed ledger technology: low barriers to transacting and anonymity (or pseudonymity) in such transactions. Lenders often fear a borrower will transfer the collateral to others. Lenders may have little effective recourse against a borrower who, after having granted a security interest, transfers the secured cryptographic asset to another, in some cases through tumblers or other mechanisms that make it technically difficult or impossible to track the asset or prevent its transfer or foreclose on the asset. Thus, many lenders are resistant to lend against cryptocurrency because of concerns that it will simply disappear after the loan is made due to the architecture and complexities of distributed ledger technology.

Another challenge to borrowing against cryptocurrency is one of trust between the borrow and lender. Contrary to popular perception, many existing computer systems touted as implementing distributed ledger technologies rely heavily on "off-chain" logic, or logic implemented in code running on computers exclusively under the control of a single entity. There may be loan servicing decisions in which the borrower may not trust the lender, or may not trust that future management of the lender will behave appropriately. Remedies in court can be uneconomic, due to the cost of lawsuits and delays (particularly when smaller amounts are in dispute), and insolvency law limits the ability of parties to keep commitments that a trustee is allowed to waive. There may be decisions in the course of servicing a loan that are not technologically constrained by systems otherwise touted as implementing distributed ledger technology, and mere legal or reputational constraints can be difficult to enforce. As a result, some borrowers may find these approaches unattractive.

Finally, to the extent other approaches are implemented with a "on-chain" logic, many types of distributed ledger technology are not well suited to accommodate adjustments to the bargain the parties originally struck. Examples of "on-chain" logic include smart contracts, which are programs run on a Byzantine-fault tolerant distributed computer system (like a blockchain computing platform), e.g., such that a threat actor interfering with one instance of program state on one computing device in the system does not necessarily prevent the larger system from reaching the correct result of executing the program. For example, it may be (and often is) desirable for lenders to engage in forbearance, and not foreclose on an asset when the initial agreement would otherwise permit the lender to acquire ownership of the collateral. Many forms of smart contracts are immutable, which is desirable for the reasons discussed in the previous paragraph, in that they can technologically enforce commitments, but such approaches can present challenges when the parties both wish to change the terms of their agreement. Thus, a lender may not wish to make a loan, or a borrower may not wish to secure a loan, if one or both parties believes that the option to adjust the terms of the agreement is not feasible with on-chain logic.

A variety of techniques are described below to mitigate the technical issues described above. Embodiments, however, are not limited to approaches that solve all, or any, of these problems. Described techniques are independently useful, and some of these techniques mitigate only a subset of the above-described issues. Indeed, some approaches described below address other issues that will be self-evident to those of ordinary skill in the art. Accordingly, the disclosure should not be read as limited to approaches that address every one of the problems described above, as the various approaches can be used to address various subsets of problems with existing approaches. Further, for similar reasons, the preceding should not be read as disclaiming any approach, as some techniques described below may be used in combination with approaches characterized above as suffering from deficiencies.

Some embodiments monitor fluctuation in the value of cryptocurrency collateral, for example, relative to a government-issued currency in which the obligation, like a loan, is denominated. In response to changes, some embodiments adjust (e.g., automatically, for instance, without human intervention) an amount of cryptocurrency serving as collateral. For example, some embodiments may automatically add cryptocurrency to a collateral account in response to determining that the value of the cryptocurrency has dropped by an amount sufficient to cause a loan-to-value ratio to fall below a threshold. In another example, which may be used with the preceding example, some embodiments may instantiate offsetting smart contracts that neutralize (e.g., some or all of) the risk of fluctuations in the value of collateral, for example, by instantiating another smart contract with a third-party that creates a put option to sell a corresponding amount of the cryptocurrency serving as collateral at a fixed price in the currency with which the obligation is denominated at a fixed date in the future.

Some embodiments mitigate the risk of the cryptocurrency collateral being transferred by the borrower with a new account created in the borrower's name, without transferring ownership of the collateral in some cases. In some embodiments, the new account be may be a distributed ledger account over which the borrower has diminished control, for instance, in virtue of access credentials being withheld from the borrower (or other grantor of a security interest, like a guarantor). For example, some embodiments may create an account for the borrower on a distributed ledger, and that account may be characterized by a public cryptographic key and a private cryptographic key of an asymmetric encryption key pair. A wallet address of that account may correspond to the public key. And the private key may be required to transfer cryptocurrency out of the account. In some embodiments, the private cryptographic key of that controlled account may be withheld from the borrower to prevent the borrower from transferring the collateral until the secured obligation is satisfied. In some cases, the borrower may retain title to that new cryptographic account, thereby retaining exposure to price fluctuations in the cryptocurrency and potentially avoiding what may be characterized as a sale of the asset, but without having the ability to transfer cryptocurrency out of the new account. In some embodiments, a smart contract may specify a wallet address to which cryptocurrency is to be transferred when the obligation is satisfied, and in some cases that wallet address may be a wallet address controlled by the owner/borrower, or in some cases the wallet address may be that of another controlled account of a junior lender against the asset with a subsequently granted security interest in the cryptocurrency. In some cases, multiple tiers of controlled accounts linked in this manner may be used to implement a hierarchy of security interests in the cryptocurrency with technical measures in place to reduce the risk of the cryptocurrency being transferred away by the borrower.

Some embodiments may implement some or all of the loan-servicing logic of a lending agreement (e.g. a promissory note and grant of a security interest) on-chain, for instance, with a smart contract, thereby potentially mitigating concerns of borrowers regarding whether the lender will continue to be trustworthy even under future management. Some of these embodiments may further expose an application program interface (API) of the smart contract to implement forbearance or other adjustments to the terms of the agreement. In some embodiments, the smart contract may be responsive to cryptographically signed inputs from both the borrower and the lender to instantiate a new smart contract with new terms under forbearance, transfer the assets to a new controlled account, and close out the existing smart contract. Examples include transferring the collateral from a first controlled account to a second control account of the new newly instantiated smart contract encoded with terms of the agreed-upon forbearance.

Examples are described below with cryptocurrency as the collateral, but it should be emphasized that the present techniques are applicable to a wide variety of virtual cryptographic assets. Other examples include utility tokens and tokens representing other types of assets, such as rights in general intangibles under the UCC, real estate, chattel, or the like. In some cases, these virtual cryptographic assets may be denominated in cryptographic tokens, like satoshi, ether, and other native cryptocurrencies, or non-native cryptocurrencies. In some embodiments, the tokens may be digital assets rendered rivalrous (e.g., such that possession or consumption by one entity prevents consumption or possession by another) by the properties of distributed ledger technology (for example, with blockchain technology), despite being in digital form. In some embodiments, the virtual cryptographic assets are fungible, like currency, or in some cases, the virtual cryptographic assets are nonfungible, like an ERC-721 (Ethereum request for comments-721) tokens. Examples of nonfungible virtual cryptographic assets include things like CryptoKitties™ and, in some cases, things like accounts receivable and electronic chattel paper, where valuation depends on the particulars of the transaction and rights represented by the virtual cryptographic asset.

In some cases, embodiments described below adjust amounts of collateral responsive to changes in relative value of various assets, like the currency in which an obligation is denominated (e.g., if the borrower is obligated to pay $100 in US dollars, US dollars is the currency in which the obligation is denominated) and a currency in which collateral is denominated (or other virtual cryptographic assets).

The role of distributed ledger technology can take a variety of forms. In some cases, logical operations are implemented outside the distributed ledger technology, for example, off-chain relative to a blockchain, while state of the loan (e.g., a loan amount, interest rate, payment due dates, debt covenants, payment histories, accrued interest, and the like), or portion thereof, may be persisted to a tamper-evident data structure, e.g., on-chain. For example, some or all of the loan parameters may be stored in a blockchain. In some cases, loan parameters may be rendered tamper evident without storing the parameters themselves in a tamper-evident data structure, for example, by writing a cryptographic hash (or output of some other one-way function responsive to the parameters as input) of the loan parameters to the tamper-evident data structure.

A variety of different tamper-evident data structures are contemplated. In some cases, a directed acyclic graph of cryptographic hash pointers may be used to render loan parameters temper evident, for example, by storing those loan parameters in nodes of the graph or storing cryptographic hash values thereof in nodes of the graph (or both). In some cases, various other cryptographic accumulators may be used as a one-way membership function to render loan state tamper evident. In some cases, these data structures may be implemented with a one-way function, like a cryptographic hash function, that it is relatively easy to compute given an input, but it is relatively difficult to invert to determine the input given an output. Easy and hard may be measured with reference to computational complexity theory, for example, with a "hard" computation being more than six orders of magnitude more resource intensive in memory or time complexity than an "easy" computation.

In some cases, the one-way function is a cryptographic hash function that maps an input of arbitrary size to a fixed length output. The cryptographic hash function may be deterministic, relatively easy to compute, computationally infeasible (e.g., hard) to invert, computationally infeasible to determine hash collisions (that is, find cases where two different inputs produce the same output), and a relatively small edit distance to an input (e.g., flipping a bit) may produce an output that it appears uncorrelated with the hash value of the unedited input. In some cases, the cryptographic hash function may be implemented with repeated application of the Merkle-Damgård construction. Examples of cryptographic hash functions include MD5, SHA-1, SHA-2, BLADE2, BLAKE3, RIPEMD-160, Whirlpool, and the like. These or other one-way functions may be repeatedly applied to the combination of updates and one-way function outputs characterizing the tamper-evident data structure, e.g., as the data structure evolves to render changes to that data structure tamper evident.

For example, it may be computationally infeasible for a threat actor to tamper with a committed value to the data structure in a way that does not make the data structure internally inconsistent due to the properties of the one-way function. The value tampered with may be inconsistent with downstream outputs of the one-way function in the data structure, and it may be computationally infeasible to select the value tampered with to compute a hash collision that would leave the data structure internally consistent. Other processes may detect such inconsistency by recomputing the one-way function and detecting that the result does not match that presently recorded output, signaling that the data structure has been subject to tampering, and in some cases, indicating which value has been subject to tampering. Such one-way functions (or other one-way functions, like asymmetric encryption functions) may further be used in cryptographic signatures applied to inputs described below to render those inputs tamper evident as well, in some cases.

FIG. 1 illustrates an example of a computing environment 10 in which some embodiments may be implemented. Other examples are described below with reference to FIGS. 4, 5, and 6, some versions of which are consistent with the embodiments characterized by FIG. 1. In some cases, these implementations may execute processes like those described below with reference to FIGS. 2 and 3 to create and service secured obligations using distributed ledger technology.

In some embodiments, the computing environment 10 is a distributed computing environment involving computing devices operated by different entities having different roles and operations described below. In some embodiments, the environment 10 includes a loan-servicer computer system 12, a borrower computing device 14, and a distributed ledger 16, which may all communicate via the internet 18. In some cases, separate computing devices (e.g., operated by different entities) may originate and service loans, or in some cases a single device (or system made of one or more devices) may fill this role. A single borrower computing device 14 is shown, but embodiments are consistent with substantially larger populations of borrower computing devices, for example, numbering in the hundreds, thousands, millions, or more. Similarly, the illustrated components of FIG. 1 may be geographically distributed, for example, over the entire United States or world.

The illustrated systems may include one or more computing devices, for example, a plurality of servers, and the devices may each include one or more processors, memory, network interfaces, and various other forms of input and output, like touchscreens, microphones, speakers, and the like. In some cases, these computing devices may include a tangible, non-transitory, machine-readable medium, such as memory (e.g., persistent or dynamic), storing program code with which the functionality described herein is implemented when executed by the processors. Notwithstanding use of the singular term "medium," that program code may be distributed among multiple computing devices, for example, with different instructions in memory of different computing devices serving different roles. Similarly, those instructions may be stored in memory of a computing device that does not execute the instructions, for example, in memory hosted in a public or private code repository, or a repository of native applications hosted by, for example, a provider of an operating system for downloads to computing devices.

In some embodiments, the loan-servicer system 12 cooperates with the distributed ledger 16 to create and service loans. Servicing secured loans (or other secured obligations) may include calculating accrued interest, providing updates to a borrower or lender about state of the loan, calculating accumulated payments, determining when the loan is in default, determining whether to grant forbearance, and determining when a loan obligation has been satisfied and a security interest can be released (and effectuating the same). In some cases, the loan-servicer system 12 additionally implements techniques to perfect security interests in collateral (or otherwise mitigate risk of other encumbrances on collateral) and adjusts amounts of collateral in accordance with the techniques described below. In some embodiments, the loan-servicer system 12 may operate in the context of a payment processor computer system like that described below with reference to FIG. 6. In some embodiments, the loan-servicer system 12 is implemented with a monolithic architecture, running on a single computing device, like a server, or in some cases, a distributed computing architecture may be used, such as a microservices architecture, lambdas, various service-oriented architectures, and the like. Or some embodiments may operate entirely on-chain, without a loan-servicer system 12, which is not to suggest that any other described feature may not also be omitted in some embodiments.

In some embodiments, the borrower computing device 14 communicates with the loan-servicer system 12 to instantiate a loan, make payments, view updates about the loan, request forbearance, and the like. The borrower computing device 14 may, for example, be various forms of computing devices operated by end users, examples including laptops, desktops, smart phones, wearable computing devices, set-top boxes, in-store kiosks, and the like. The borrower computing device 14 may execute an application by which information is presented to users and inputs are received from users, examples including a web browser or native mobile application or other special purpose application, each of which may execute with an operating environment operating system of the device 14.

In some cases, the borrower computing device may be operated by a user who, by operation of a client application (like a browser or native application) supplies credentials, like a username and proof of possession of some knowledge-factor credential, like a hash of a password, to authenticate themselves to the loan-servicer system 12. In some cases, the user's identity indicated by such credentials may be associated with a broader suite of services provided by an operator of the system 12, for example, payment processing services like those described below. Or in some cases, the extent of the relationship between the identified user and the entity operating the system 12 may be a single loan.

In some embodiments, the distributed ledger 16 may serve various roles, depending upon the implementation, as discussed above. In some embodiments, the distributed ledger 16 may be a public or a private, permissioned or permissionless, implementation of distributed ledger technology, like a public or private blockchain. In some embodiments, state of the distributed ledger 16 may be replicated among a plurality of different computing devices controlled by a plurality of different entities, and a consensus algorithm may be executed to determine state of the distributed ledger, such that modifications to the distributed ledger cannot be made unless more than a threshold amount of the participating entities reach consensus. Examples of such consensus algorithms include Paxos, Raft, HotStuff, Tendermint, Casper, and various other Byzantine fault-tolerant consensus protocols. In some cases, various entities (e.g., participating computing devices, or peer application instances executing thereon and serving as peer nodes in a Byzantine fault-tolerant network) may serve different roles in consensus protocols. For example, some entities may be elected as leaders and those entities may emit a periodic heartbeat signal to other peer nodes. In some embodiments, peer nodes may elect a new leader responsive to the absence of such a heartbeat signal for more than a threshold duration of time to afford resiliency to the failure of any one peer node. In some cases, peer nodes may determine consensus regarding state by majority vote, e.g., as computed by leaders based on votes from other peer nodes.

In some embodiments, peer nodes participating in consensus determinations may be required to demonstrate the right to do so before being permitted by other peer nodes to participate. In some cases, peer nodes may be required to demonstrate that they have consumed some scarce resource, for example, by executing a proof-of-work or proof-of-storage routine. In some embodiments, proof-of-work may be implemented by computing a partial hash collision. Some embodiments may require peer nodes to compute an input to a hash function that produces an output with a specified number of leading or trailing zeros, for example, and a designated suffix or prefix that varies between proofs. In some cases, peer nodes may be required to stake cryptocurrency as a condition of participating in consensus determinations, for example, without having to execute proof-of-work or proof-of-storage. Some embodiments may be implemented without requiring any of these approaches (which is not to suggest that other described features are limiting), for example, in permissioned private blockchain implementations in which peer nodes are authenticated by demonstrating possession of credentials to other peer nodes, for instance, by transmitting a cryptographic hash of a password or cryptographically signing a challenge (e.g., a string with a designated amount of entropy, like a random value of 256 bits or more) with a private key corresponding to a public key to which the challenge was addressed. Other peer nodes may verify these signatures as a condition of counting votes from the signing peer nodes.

In some embodiments, peer nodes may be addressed and authenticated based on public key infrastructure. In some cases, peer computing nodes with which the distributed ledger is implemented may each have an address corresponding to a private cryptographic key and public cryptographic key generated with an asymmetric encryption algorithm, each peer node being uniquely identified by a different key pair in some embodiments. Examples include ElGamal, Diffie-Hellman, RSA, elliptic curve, lattice-based encryption techniques, and the like (which are all relevant to other references to asymmetric encryption herein). In some cases, the address (at the application layer) of peer nodes is the public key, or the address may be deterministically computed based on the public key. In some embodiments, application layer addresses may be implemented with techniques like distributed hash tables, for example, with Kademlia, Chord, Tapestry, Pastry, or the like. Some embodiments may discover peer nodes with various forms of orchestration tooling or domain name services.

In some embodiments, the distributed ledger 16 may, in addition to rendering some state of the loans or all state of the loans tamper evident, execute logic of the loan agreements. Examples include calculating accrued interest, determining whether payments are late or debt covenants have been breached, determining accumulated payment amounts, detecting default, implementing forbearance, determining when collateral fails to satisfy loan-to-value thresholds, and determining when a loan obligation has been satisfied and a security interest can be released. In some cases, some or all of these logical operations may be implemented in a decentralized manner, for example, with a blockchain-based computing platform like Ethereum™, Cosmos™, Cardano™, EOS™, or Hyperledger™. In some cases, the decentralized computing platform may persist state to the above-describe tamper-evident data structures and the computing nodes may use verifiable computing techniques to execute scripts in a way that does not require all of the computing devices be trusted to faithfully execute the logic of the script. Examples include smart contracts implemented on the preceding platforms, for example, encoded in Solidity or Java or interpreted to a native bytecode.

In some embodiments, the scripts (or other types of programs) may be assigned an address on the distributed ledger (in some cases, in the same address space as wallet addresses), and functionality of the scripts may be invoked by transacting with that address with transactions including arguments of the script, like variables, and other parameters of called functions. Upon being invoked, the scripts may be executed in a replicated fashion among a subset or all of the peer nodes with which the distributed ledger 16 is implemented, and the peer nodes may arrive at a consensus as to the result of executing the script in a manner like that described above with a consensus protocol. As a result, in some cases, the entities operating the peer nodes need not be trusted (e.g., to not interfere with executing of their local copy of the script by, for instance, tampering with its code or local state), as long as malicious peer nodes constitute less than a threshold amount of the participants in the network of peers determining consensus (e.g., less than half or less than a third). In some embodiments, to expedite operations, sharding may be used, and a subset of peer nodes may concurrently and redundantly execute the script to reach consensus. In some cases, those subsets may be selected, for example, randomly, for instance, in sharded some blockchain-based computing platforms. Or in some cases, every peer node in the computing platform may execute a smart contract redundantly upon invocation of the smart contract.

In some cases, logic that is related to servicing the loan may be executed by either the loan-servicer system 12 or a Byzantine fault-tolerant decentralized computing platform, like one implementing the distributed ledger 16. All permutations of allocation of logic between these two architectures are contemplated. For example, some logical operations may be performed on the system 12 and others on the system implementing the distributed ledger 16, all logical operations may be performed in the system 12, or all logical operations may be performed on a decentralized computing platform implementing the distributed ledger 16. Similarly, various permutations of allocation of state between these two architectures are contemplated, in some cases, with only a single field being rendered tamper evident by a distributed ledger.

In some cases, peer nodes implementing the distributed ledger 16 may be geographically distributed and may communicate via the internet 18. In some embodiments, the distributed ledger 16 may have a federated architecture, like a permissioned distributed ledger in which some of the peer nodes have more elevated authority relative to others. Examples include some implementations of Libra™ and some implementations of Cardano™.

Some functionality of the loan-servicer system 12 and the distributed ledger 16 may be implemented with processes like those described below with reference to FIGS. 2 and 3.

Figure 2:
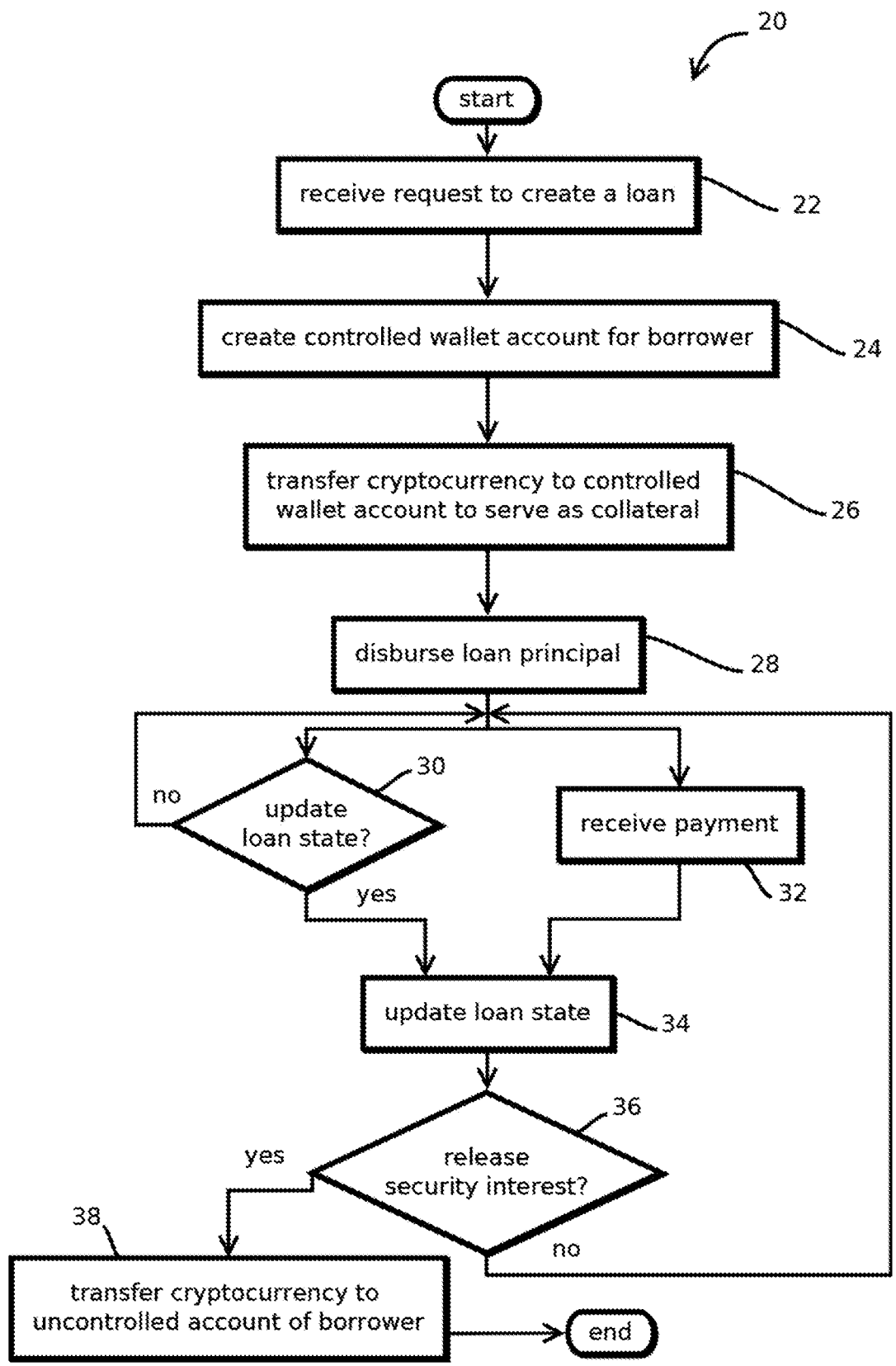
FIG. 2 is a flow chart of an example of a process to manage cryptocurrency collateral, in accordance with some embodiments.

In some embodiments, loans may be serviced with a process 20 illustrated by FIG. 2. The functionality of this process and the other functionality described herein may be implemented with program code stored on computer-readable media, like a tangible, non-transitory, machine-readable medium. The described operations, here, and elsewhere, may be executed in a different order from that described, some operations may be repeated, some operations may be executed concurrently, some operations may be executed serially as depicted, operations may be omitted, and additional operations may be inserted, none of which is to suggest that any other feature described elsewhere herein is limiting. In some cases, multiple instances of the described processes may execute concurrently in multiple concurrent sessions, like more than 10, 100, or 1,000 concurrent sessions. In some embodiments, as discussed above, various steps of the process 20 may be executed on different computing devices, for instance, some or all may be performed by the loan-servicer system 12, the computer system implementing the distributed ledger 16, or both.

In some embodiments, the process 20 includes receiving a request to create a secured loan (or various other forms of secured obligation), as indicated by block 22. Examples include purchase money loans, cash loans, payday loans, margin accounts, and lending against various forms of general intangibles, like those discussed above. In some embodiments, the request may be received by the system 12 described above from the borrower computing device 14, for instance, from a native application or web browser executing thereon and presenting an interface, such as one served by the loan-servicer system 12 to receive and provide loan parameters to the system 12. Or in some cases, the request may be received by a smart contract executing on a computer system implementing the distributed ledger 16. Or in some cases, a request may be received by the system 12, and that request may be transformed into a request received by the computer system implementing the distributed ledger 16. In some embodiments, the request may specify the loan parameters described above or various subsets thereof.

In some embodiments, the request is a transaction to instantiate a smart contract implementing a loan. In some embodiments, the computer system hosting the distributed ledger 16 may instantiate the smart contract, assigned the smart contract an address in an address space of the corresponding computing platform (which may be an application-layer address that is distinct from a network layer address space), and record the instantiation and initial state in a tamper-evident data structure like those described above. In some embodiments, instantiation may include executing steps 24 through 28 described below and scheduling or registering to receive events that cause execution of other operations described with reference to FIG. 2, for instance, by registering callback functions with a time oracle, a price oracle, an interest rate oracle, or a payments oracle, like those described below with reference to FIG. 4. In some cases, registering a callback function may include identifying the address of the instantiated smart contract and indicating arguments and name of the function to be supplied in the call back.

Some embodiments may create a controlled wallet account for the borrower, as indicated by block 24. A controlled wallet account is an account of the distributed ledger 16 or another distributed ledger in which the borrower's ability to transfer assets (or at least the assets designated as collateral) out of the account is limited or eliminated without the consent of the lender. Examples include a Bitcoin, Ethereum, or Hyperledger account for which the borrower is not provided the private key (or recovery passphrase or other knowledge factor credentials) required to transfer assets out of the account. (In some cases, a controlled wallet account can be transformed into an uncontrolled wallet account by providing this information to the borrower.) Or in some cases, a distributed ledger may support operations by which a virtual cryptographic asset is designated as non-transferable without a lender providing consent, e.g., with a cryptographically signed message to that effect, and some embodiments may only constrain a subset of assets in an account, an arrangement also consistent with the term "controlled wallet account," which may also be referred to as a "controlled account." Similarly, in some cases, a distributed ledger may support operations by which downstream parties acquiring assets do so subject to on-chain foreclosure of the asset, e.g., with on-chain notice provided to the party, and by operation of smart contract, an arrangement also consistent with the term "controlled wallet account," as the control runs with the asset after transfer from the account. The term "wallet account" refers to an account that, given the proper credentials, is accessible via, for example, a wallet application, but does not require a wallet client application to be used.

In some cases, creating a wallet account can be relatively computationally expensive and can be particularly resource intensive when done on-chain, in part due to replicated instances of the operations being run on a plurality (and in some cases, all) peer nodes. In some cases, as a result, transaction costs, e.g., in the form of a native cryptocurrency consumed when computing smart contracts, can be relatively high. To make this operation less resource intensive, some embodiments may create the wallet account off-chain, e.g., with the loan-servicer system 12 computing the corresponding cryptographic key pair, and then some or all of the resulting credentials and addresses may be written to the smart contract before deployment. Or some embodiments may perform these operations on-chain, e.g., by executing an asymmetric encryption protocol to create the account in a smart contrast.

In some cases, creating the controlled wallet account may include communicating an account address to the borrower's computing device, for example, in the form of a QR code (or other optically scannable code) or string of characters. Or in some embodiments, this information may be withheld from the borrower. In some embodiments, the controlled wallet account may be deemed to be owned by the borrower in memory of the loan-servicer system 12, for example, as indicated in agreements between the borrower and the lender, with the lender having a security interest in assets transferred to the controlled wallet account. In some cases, a pre-existing controlled wallet account may be re-used, an arrangement consistent with use of the term "create" in this context.

Reference to accounts should not be read to suggest that the present techniques are limited to blockchain computing platforms having an account/balance model. Some embodiments may also or alternatively implement a UTXO (unspent transaction output) model. Both of which are consistent with use of the term "account." A wallet account may have a private cryptographic key and a corresponding public cryptographic key, such as one generated with the above-described examples of asymmetric encryption protocols. Assets may be transferred to the wallet account by transferring them to an address that is or corresponds (e.g., deterministically in a one-to-one relationship) to the public cryptographic key. In some embodiments, the computer system implementing the distributed ledger 16 may require that a transaction transferring assets out of the wallet account include or be associated with information demonstrating possession of the private cryptographic key, for example, a cryptographic hash thereof or a cryptographically signed challenge that is signed with the private cryptographic key corresponding to the public address of the wallet account.

In some cases, the controlled wallet account may be distinct from another wallet account of the borrower, such as another wallet account in which the cryptocurrency or other virtual cryptographic asset that will serve as collateral resides. In some embodiments, the borrower may have a wallet account that is uncontrolled from the perspective of the lender and, upon execution of block 24, a wallet account that is controlled from the perspective of the lender. In some cases, the borrower may have access to the private cryptographic key of the uncontrolled wallet account to transfer assets from that account, e.g., in virtue of such a key being stored by a client wallet application executing on the borrow computing device and storing the key in memory of that device.

In some embodiments, the process 20 includes transferring cryptocurrency to the controlled wallet account to serve as collateral, as indicated by block 26. The collateral may be collateral to the loan created in block 22. In some embodiments, each created loan may have a unique identifier, such as the address of the smart contract with which its created, or another identifier in some other namespace, like that of the loan-servicer system 12 described above. In some cases, the cryptocurrency is transferred responsive to instructions from the borrower's computing device (e.g., from a wallet client application) by the computer system implementing the distributed ledger 16 without further operation of a smart contract creating loan. Or in some embodiments, as part of creating the loan, the borrower computing device may supply the information needed to effectuate the transfer by operation of the smart contract, for instance, supplying the value demonstrating possession of the private cryptographic key of the uncontrolled wallet account from which the collateral is to be transferred to the controlled wallet account and an address of the uncontrolled wallet account from which the virtual cryptographic assets, like cryptocurrency, are to be transferred. In some cases, for instance where the collateral is a nonfungible asset, the creation of the loan may include identifying those tokens with unique identifiers that distinguish them from other instances of that type of token. For some types of nonfungible assets, the smart contract may distinguish between instances of nonfungible virtual cryptographic assets when transferring to the controlled wallet account to select the appropriate virtual cryptographic asset to transfer that accords with the parties' intent, for instance, as expressed in the request to create the loan. The request to create the loan may refer to a loan (or other obligation) that already exists in a legal sense or a loan that does not yet exist, both consistent with the term "create," as both create records by which a loan is documented and managed in the systems described herein. Similarly, obtaining parameters of an obligation can be performed both for a pre-existing obligation and one for an agreement that is yet to be consummated. Creating refers to creating the corresponding records (executable or otherwise) of such an obligation.

In some cases, a different entity from the lender or the entity operating the loan-servicer system 12 may control the controlled wallet account. Examples include a bailee or an escrow agent. Further, in some cases, control may depend on possession of multiple credentials corresponding to multiple entities, e.g., in an escrow arrangement in which both the borrower and lender must consent to a transfer with cryptographically signed messages. In each of these examples, herein, the collateral is still said to be under the control of the entity operating the loan-servicer system 12, e.g., even if control is delegated or shared.

In some embodiments, the described requests and messages may be a single transmission, or the conveyed information may be sent in a sequence of transmissions as part of a session, for example, with intervening back-and-forth, all consistent with use of the singular term "request" and similar terms in singular form.

Some embodiments may determine whether a specified amount of cryptocurrency designated as collateral is present to be transferred as part of the transfer operation 26. Upon determining that the threshold amount is not present to be transferred, some embodiments may cease operation and issue an alert and, in some cases, transfer the cryptocurrency back to the uncontrolled wallet account and prevent disbursement of loan principal, as the specified collateral is not present. Or some embodiments may cause the borrow computing device to present a user interface by which the user may intervene to supply additional collateral or identify other addresses. In some cases, a user may specify a plurality of different uncontrolled wallet accounts from which funds are to be transferred, in some cases specifying how much cryptocurrency to transfer from each of the different wallet accounts, for example, as part of the request to create a loan in operation 22, and some embodiments may execute operation 26 a plurality of different times for each of those different uncontrolled wallet accounts.

Upon determining that the specified collateral has been transferred to the controlled wallet account in operation 26, some embodiments may disperse loan principal, as indicated by block 28. In some cases, this may include an ACH transfer, effectuating the mailing of a check, or a transfer of some other form of cryptocurrency, like a stable coin (e.g., a cryptocurrency pegged to a government-issued currency), to a wallet account address designated by the borrower. In some cases, this wallet account address may be specified in the request to create a loan, along with the amount of loan principal to be provided.

Some embodiments may subsequently perform operations described below to service the loan over the life of the loan. In some cases, some of these operations may be initiated responsive to events, for example, upon invocation of the above-described registered callback functions, like responsive to a price change in the collateral as an event, responsive to a threshold duration of time elapsing, responsive to a specified time occurring, responsive to a payment, or the like. In some embodiments, some of these operations may be executed repeatedly asynchronously, periodically or intermittently, throughout the life of the loan, until the security interest is released or the collateral is foreclosed upon. In some cases, the various described oracles may be polled with periodic queries by some embodiments to obtain such events.

Some embodiments may determine whether to update loan state, as indicated by block 30. In some cases, this determination may be made, for example, by the loan-servicer system 12 that runs area rules engine with an infinite loop that cycles, e.g., every few seconds, hours, or days, and determines in each cycle whether to update loan state of each loan in the system based on various criteria (e.g., whether a payment is due or a duration of time has elapsed since a previous update). Upon determining that it is not time to update loan state, embodiments may return until another operation is triggered, as indicated in FIG. 2. Upon determining that it is time to update loan state, for example, responsive to a price change query, a time that has lapsed, or another event that has occurred, some embodiments may proceed to update loan state, as indicated in block 34, e.g., by executing the process of FIG. 3.

In some embodiments, updating loan state may include the operations described below with reference to FIG. 3. Examples include calculating interest payments, determining whether collateral satisfies loan-to-value ratios, computing accrued interest, calculating accumulated payments, determining whether the loan is in default, or determining whether the loan obligation has been satisfied.

Some embodiments determine whether a payment has been received, as indicated by block 32. In some embodiments, this may be one type of event to which the determination of block 30 is responsive to update loan state. The determination of whether a payment has been received may be made by querying a database in which payment history is stored or responsive to an event, for instance, one that invokes a registered callback function like that described above that prompts a loan update. Again, receiving a payment may result in the updating of the loan update, as indicated by block 34, e.g., by executing the process of FIG. 3.

Some embodiments may include determining whether to release a portion of an entirety of the security interest, as indicated by block 36. In some cases, this may be part of updating loan state 34, e.g., by executing the process of FIG. 3. Some embodiments may determine whether the total of the accumulated payments (e.g., monthly payments over a year or longer, or a one-time payment) is greater than or equal to a threshold value, like a value of the secured obligation, which in some cases, may include the loan principal and interest and fees. In some cases, interest may be compounded or non-compounded interest may be applied.

Upon determining to not release the security interest, some embodiments may continue the above-described operations, as illustrated.

Upon determining to release the security interest in block 36, some embodiments may proceed to transfer the cryptocurrency to an uncontrolled account of the borrower (or guarantor if different), as indicated by block 38. In some embodiments, this transfer may be effectuated without moving the cryptocurrency between wallet accounts, by transforming the controlled wallet account into an uncontrolled wallet account. Such transformation may be effectuated by disclosing the private cryptographic key or other knowledge factor credentials to the borrower for the controlled wallet account to transform that account into an uncontrolled wallet account, an arrangement also consistent with use of the term "transfer." Or some embodiments may effectuate a transfer to a wallet account specified by the borrower in the request to create the loan or, if different, to the wallet account from which the funds were transferred into the controlled wallet account. The term "transfer" is not limited to operations of a smart contract. The term's referents include operations by a smart contract to transfer cryptocurrency and actions that invoke, directly or indirectly, such operations by a smart contract. A party can transfer cryptocurrency by executing the smart contract when effectuating a move of cryptocurrency between accounts or by causing such a transfer another way, for instance by calling the smart contract to request such a move (without executing the smart contract themselves). The transfer may include updating a record in a distributed ledger to reflect the change, as discussed below with reference to FIG. 5.

Additionally or alternatively to perfecting by control, some embodiments may perfect the security interest by filing a financing statement, such as a UCC-1 form, with the borrower's home state, such as the state in which a business entity is formed or operates. Some embodiments may release a security interest by filing a release as well. In some cases, the filing may be via an application program interface exposed by a governmental entity with which such filings are made. Some embodiments may further query these records via such an API before creating a loan and determine, based on a response, whether the proposed collateral is encumbered, in which case some embodiments may determine to not create the loan.

In some embodiments, various rights that accompany the collateral may be allocated by operation of the smart contract or agreement between the parties. Examples include staking rights. In some cases, the lender may exercise the right to stake the cryptocurrency in the controlled account of the borrower and retain the right to transfer rewards for staking to an account of the lender, or in some cases, staking may be performed on behalf of the borrower, and the proceeds may be transferred to the controlled account or an uncontrolled account of the borrower. Some embodiments may automatically stake collateral and allocate rewards for doing so. Similarly, governing rights on the computing system implementing the distributed ledger 16 may be accorded by agreement of the parties and, in some cases, encoded in the smart contract. Examples include voting rights on changes to operation of the distributed ledger 16. In some cases, the these rights may be reserved for the lender, to dis-incentivize majority attacks in which borrowers attempt to enhance their voting positions temporarily by offering up their cryptocurrency as collateral and using the loan proceeds to purchase additional cryptocurrency, in some cases repeating the process an arbitrary number of times to amplify their voting power to, for example, damage a cryptocurrency platform in which they have previously taken a short position, thereby, potentially leaving the lender with impaired or worthless collateral.

In some cases, the public (off-chain) identity of borrowers or lenders may be attested to by an identity oracle. Such systems may cryptographically sign statements attesting to the identity of the parties responsive to various controls in place, e.g., inspecting authenticating documents, or a history of previous engagements.

Use of the singular term "smart contract" should be understood as encompassing implementations in which functionality is distributed among multiple scripts, for example, in a call graph in which program code is organized into different modules, which may themselves each be designated as distinct smart contracts having distinct addresses on a blockchain computing platform. These call-graph-based implementations are consistent with use of the singular term "smart contract."

Further, relying on antecedents should not be read to exclude evolution of the thing referenced over time, between references. For example, reference to "a smart contract" followed by reference to "the smart contract" should be read as encompassing implementations in which different smart contracts in the same call graph respectively correspond to the antecedent and the subsequent reference, i.e., that using the definite article. Similarly, reference to a unit of cryptocurrency (or other fungible virtual cryptographic asset) followed by reference to "the" cryptocurrency are consistent both with scenarios in which the same units of cryptocurrency are being referenced and scenarios where there has been turnover in the cryptographic assets being referenced. For example, adding a bitcoin to an account referenced as "a bitcoin," replacing that bitcoin with another, and then referencing "the bitcoin" should be understood to encompass this scenario, in which the bitcoin is different from that initially added. In another example, reference to "an obligation" or "a loan" followed by reference to "the obligation" or "the loan" is consistent with scenarios in which the amount of outstanding obligation or loan balance has changed between references, e.g., creating a loan, making a payment against the loan, and then determining whether the loan has sufficient collateral includes scenarios where the loan balance for the determination is different from that present when the loan is created. Similar principles should be applied to terms relating to other referents that evolve over time.

Figure 3:
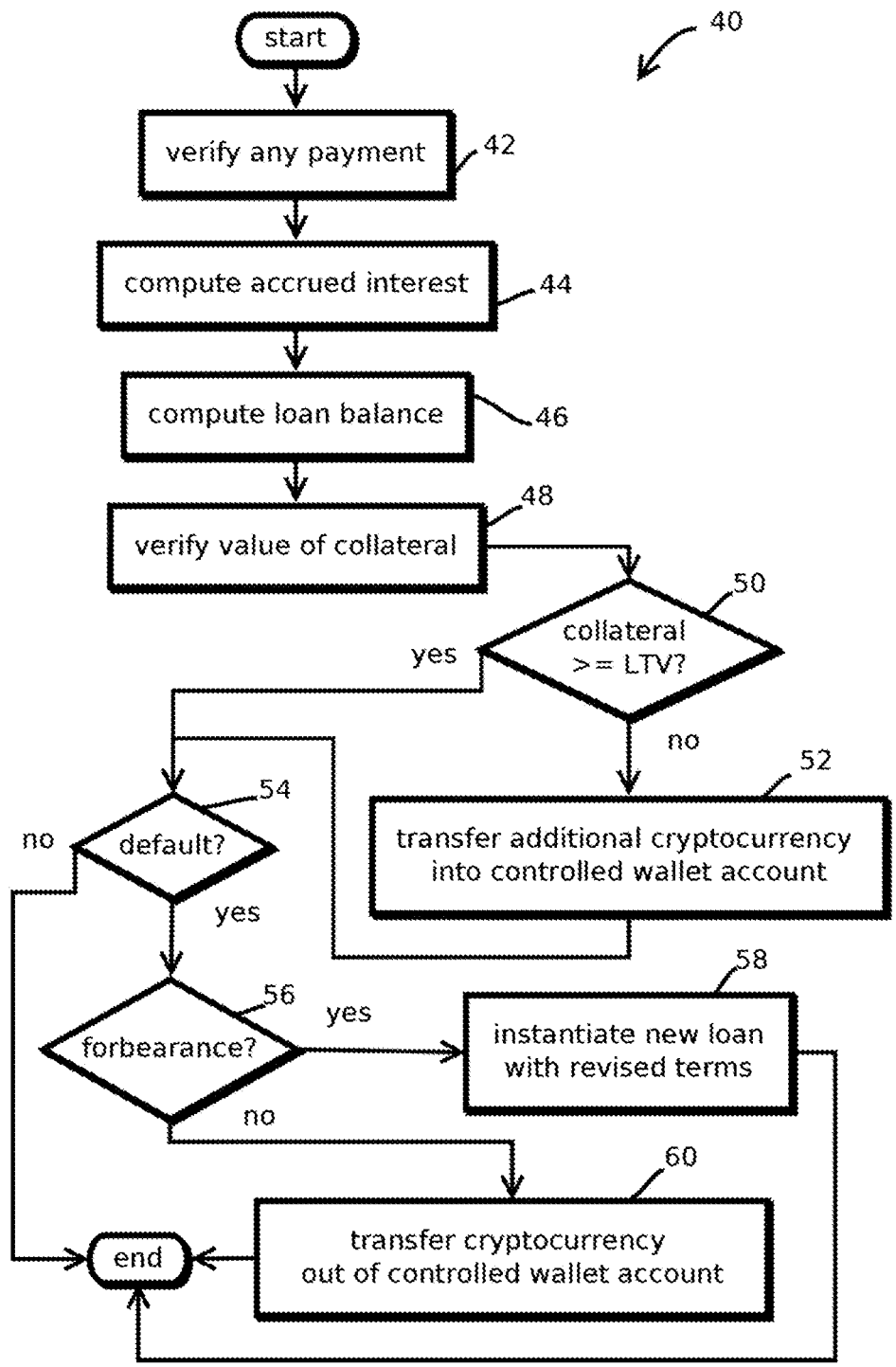
FIG. 3 is a flow chart of an example of a process to update state of a loan secured by cryptocurrency, in accordance with some embodiments.

FIG. 3 illustrates an example of a process 40 by which loan state may be updated. As with the other functionality described herein, the illustrated operations may be implemented by operation of the smart contract or off-chain, for example, with logic implemented by the loan-servicer system 12 described above, or in any permutations of combinations thereof.

In some embodiments, the process 40 includes verifying any payments that may have been made, as indicated by block 42. In some embodiments, payments may be made on-chain, for example, by transferring a cryptocurrency in which the loan is denominated into a payment account of the lender. In some embodiments, a payment account unique to the loan or unique to the borrower may be created, or a single shared payment account may be used across all loans for a given lender. In some cases, transactions making payments corresponding to a loan may be accompanied by identifiers of those loans, like an address of a smart contract encoding the loan, for instance, in comment fields, so that payments may be mapped to the appropriate loan.

In some cases, payments may be made off-chain, for example, into a bank account of the lender, such as one operated by, or with access rights accorded to, the entity operative operating the loan-servicer system 12. In some cases, this entity or another entity may operate a payments oracle like that described below, which may generate events, respond to queries, or execute callback functions that inform a smart contract of a payment event and the attributes thereof, like the date and amount. In some cases, these payment attributes may be cryptographically signed with a private key corresponding to a public key of the payments oracle, and verifying payment may include ensuring that the payment information has not been tampered with by verifying that the cryptographic signature, for instance, that the public key corresponds and that the signature demonstrate possession of a private key, or in some cases that the payment information hashes to a cryptographic hash included with the signature. In some cases, if any of these checks do not correspond, some embodiments may decline to credit the payment and log an alarm, or some other error message may be logged, which may prompt human review.

Some embodiments may further compute accrued interest, as indicated by block 44. Again this, like the other operations may be performed on-chain or off-chain. In some embodiments, interest may be compound interest. In some cases, a current loan state may indicate a time at which the current loan state was computed, and computing the accrued interest may include computing a delta in time between the current time and that time and calculating an amount of interest based on the interest rate stored on chain and associated with the loan, like as a parameter of the smart contract.

Some embodiments may compute a loan balance, as indicated by block 46, which again may be implemented on-chain or off-chain. In some cases, computing the loan balance may include summing payments and accrued fees and computed interest. In some embodiments, the computed loan balance may be persisted to the distributed ledger 16 described above, or otherwise rendered tamper evident, for instance, by storing the value off chain and writing a cryptographic hash thereof on-chain.

Some embodiments may verify a value of the collateral, for instance, in the controlled wallet account discussed above, as indicated by block 48. In some embodiments, verifying the value of the collateral may include querying or receiving an event or invocation of a callback function from a payments oracle, like those discussed below. In some embodiments, received information may again be cryptographically signed, and the types of verification applied to the payment may also be applied to price information to, for example, prevent or impair attacks in which fraudulent price information is injected into the system by threat actors. For example, some embodiments may verify that the price information, like price of the cryptocurrency in the collateral account, is from an entity that has demonstrated access to a private cryptographic key corresponding to the public cryptographic key (or other corresponding identifier) of the entity expected to provide the price information. In some cases, the price oracle may be an exchange in which the cryptocurrency in the collateral account is publicly traded, like the Coinbase™ oracle accessed via the corresponding API.

In some cases, time information may also be provided by a time oracle, for instance, via signed attestations as to the current time. In some embodiments the time information may also be subject to verification like that described for price information and payment information, to verify that the time information (e.g., the current time) is being obtained from a trusted party.

Some embodiments may determine whether the value of the collateral is greater than or equal to a loan-to-value ratio, as specified in block 50. In some embodiments, when creating the loan, loan parameters may specify a loan-to-value ratio of the collateral in terms of a currency in which the loan is denominated, like US dollars or a stable coin. Some embodiments may multiply the collateral by the price information and determine whether the result satisfies a threshold corresponding the loan-to-value ratio, for example, is greater than (or is greater than or equal to) the threshold, both being examples of satisfying a threshold criterion. Some embodiments may divide the product of the collateral and the price information by the loan principal or an amount outstanding on the loan balance to compute a loan-to-value ratio and determine whether that value satisfies the threshold loan-to-value ratio. Some embodiments may adjust the loan-to-value ratio based on various events or other data, e.g., some embodiments may compute a creditworthiness score (e.g., of the transaction or of a party to the transaction) based on other behavior, for instance other transactions involving the computing environment of FIG. 6 (e.g., direct deposits, reoccurring payments, etc.). In some cases, the loan-to-value threshold may be adjusted to specify less collateral responsive to such signals indicating greater credit worthiness.

Upon determining that the threshold is not satisfied, for instance, that the collateral does not have sufficient value, some embodiments may proceed to block 52. Some embodiments may then transfer additional cryptocurrency into the controlled wallet account, as indicated by block 52. In some embodiments, this transfer may be effectuated with the techniques described above with reference to block 26. In some embodiments, a window of time may be designated in which the transfer must be implemented at the instruction of the borrower, for instance, with a corresponding callback function being registered to effectuate a check at the corresponding time, or some embodiments may automatically transfer the additional cryptocurrency into the controlled wallet account using information supplied by the borrower. Some embodiments may then proceed to block 54 in some cases without regard to the result of block 50.

Some embodiments may determine whether the loan is currently in a default state, as indicated by block 54. In some cases, default may occur because additional cryptocurrency is not available to satisfy the determination of block 50. Other criteria for default may include a determination of whether a payment has not been received by a specified time or other debt covenants have not been met.

In some embodiments, interest rates may be variable, and some embodiments may access an interest rate oracle to obtain a current interest rate by various measures. In some embodiments, the interest rate oracle may provide a cryptographically signed variable interest rate, such as the secured overnight finance rate (SOFR) or the London interbank overnight rate (LIBOR), and in some cases, loan parameters may specify how to calculate an adjustable interest rate, for instance, by causing a smart contract to add a constant to these reference rates.

Upon determining that the loan is not in default, some embodiments of the process 40 may terminate, until invoked again, for instance, in the context of block 34 in FIG. 2.

Upon determining that the loan is in default in step 54, some embodiments may proceed to determine whether forbearance has been requested, as indicated by block 56. In some embodiments, the step may be reached without regard to whether default has already occurred in the flow of process 40, which is not to suggest that other operations are limited to the sequence with which they are currently presented. In some cases, determining whether forbearance has been requested may include determining whether a forbearance function of the loan's smart contract has been invoked with parameters indicating the consent of both the lender and the borrower. In some cases, such consent may be indicated by cryptographically signing a message, like a challenge or the request itself with a private cryptographic key corresponding to a public key that correspond to an identifier of each party. Determining whether forbearance is requested may include verifying these consents (e.g., that the cryptographic signature demonstrates possession of the correct private keys, in some cases, based on the public keys and without access to the private keys being afforded to the process performing the verification).

Upon determining that forbearance has been requested, in some embodiments, the smart contract encoding the loan (or corresponding off-chain logic, e.g., executed by the loan-servicer system 12) may execute a subroutine to implement the forbearance. In some embodiments, the forbearance subroutine creates a new loan using techniques like those described above with revised terms indicated in new loan parameters (e.g., supplied in the request for forbearance from computing devices of the parties). In some cases, this may include instantiating the new loan (e.g., a new smart contract) with revised terms, as indicated by block 58. The new loan may capture the revised terms while leaving the previous version unchanged in memory, other than being designated as overridden by the new smart contract in memory in some embodiments. In some cases, loan smart contracts may include logic to check for such records and may call an address of the new version of the smart contract when invoked upon detecting such a record.

Some embodiments may create a new controlled wallet account corresponding to the forbearance version of the loan with the new terms and instantiate a new smart contract with the new forbearance terms, in some cases referencing the old smart contracts address. In some cases, the operations described herein may be subsequently be formed performed by operation of that forbearance smart contract with the new terms in place of the current smart contract. As a result, in some cases, by both parties' consent, while implementing operations on-chain or off-chain, flexibility may be afforded to the parties as they adjust the terms of the agreement in view of new information during the life of the loan, in some cases without being constrained by the immutable properties of many types of blockchain implemented records, like many forms of smart contract.

In some embodiments, executing the smart contract may include verifying that code of the smart contract, like bytecode or source code, has not been modified by comparing a version requested to be executed against records in the tamper-evident data structure to verify, for example, that cryptographic hash values match between the version to be executed and the version committed to the tamper-evident data structure, to verify that the correct code is being executed.

Upon instantiating a new loan with revised terms, embodiments may terminate operation until the next invocation of block 34 in the process 20 of FIG. 2, in some cases with reference to the new loan with forbearance terms applied.

Figure 4:
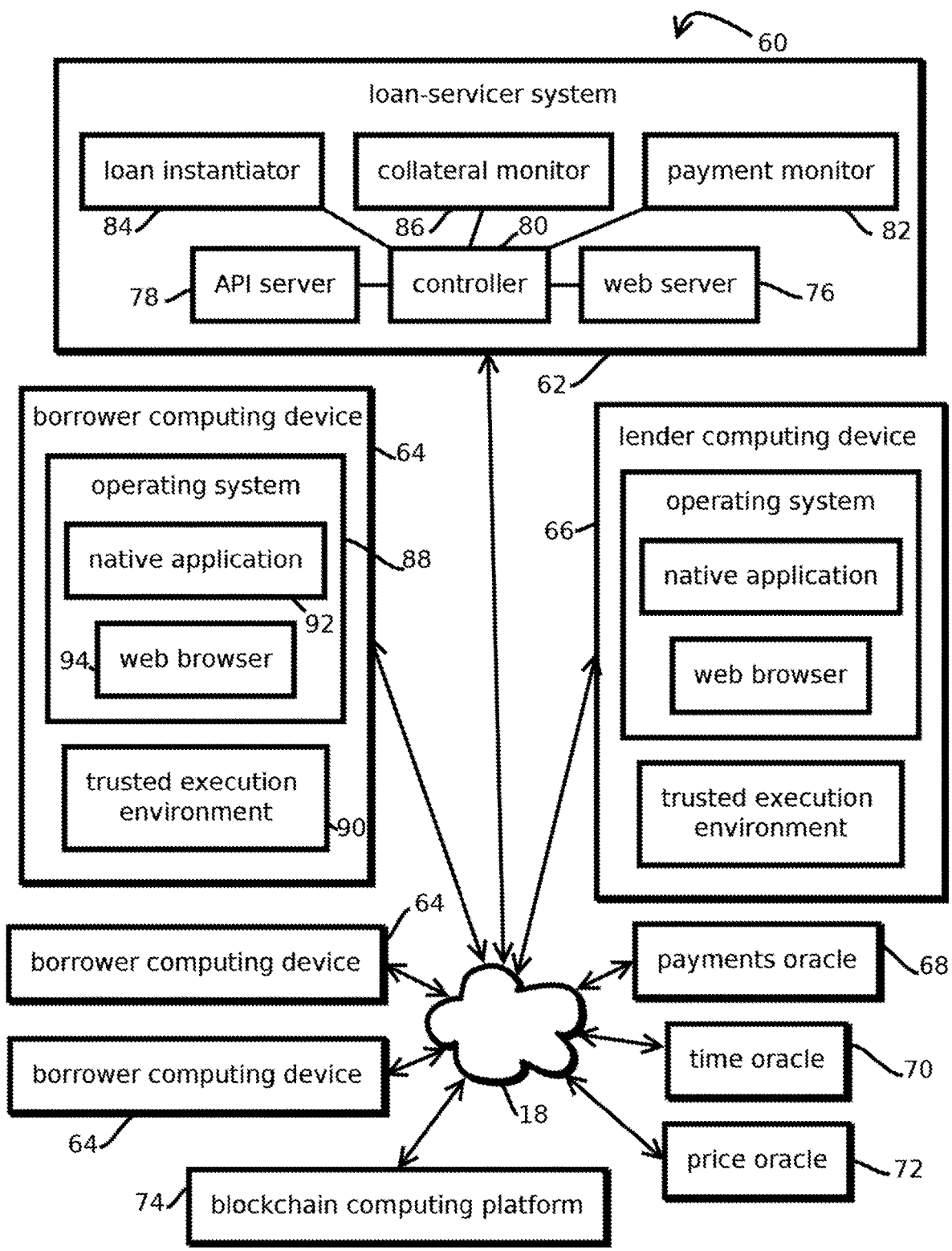
FIG. 4 is a block diagram of an example of another computing environment in which cryptocurrency collateral may be managed, in accordance with some embodiments.

FIG. 4 illustrates an example of a computing environment 60 in which techniques like those described above may be implemented. In some embodiments, a loan-servicer system 62 may cooperate with a blockchain computing platform 74 to execute the processes of FIGS. 2 and 3. In some embodiments, the computing environment may include the loan-servicer system 62, the blockchain computing platform 74, a plurality of borrower computing devices 64, a lender computing device 66, a payments oracle 68, a time oracle 70, and a price oracle 72, all of which may communicate via the internet 18. In some embodiments, these components may be organized and configured in the manner of corresponding components described above with reference to FIG. 1, or in some cases they may be different, which is not to suggest that any other description is limiting.

In some embodiments, there may be a plurality of borrower computing devices 64. Three are shown, but embodiments are consistent with substantially more, like more than a million, or more than 10 million, geographically distributed over the United States or the world. Similarly, a single lender computing device 66 is shown, but embodiments again are consistent with substantially more, for instance, in similar numbers to those described for the borrower computing device 64.

In some embodiments, the payments oracle 68 may be a server system operated by an entity that receives the payments or has access rights to an account with such an entity, like a bank. In some cases, the payments oracle 68 may include code that detects that a payment has been made, formats information into a schema ingestible by a smart contract or the loan-servicer system 62, cryptographically signs that information (for instance, with a private cryptographic key of the payments oracle 68 corresponding to a public key by which the payments oracle 68 is identified to the blockchain computing platform 74 or the loan-servicer system 62), and conveys that information to one or both of those entities. In some cases, the various oracles may further be configured to selectively invoke registered callback functions specified by smart contracts or the loan-servicer system 62 that invoke functionality, like event handlers to be run when new information is available from the oracles 68 through 72. Or in some embodiments, oracles 68 through 72 may respond to queries sent by these components 62 or 74 at a time determined by the loan-2servicer system 62 or a smart contract on the blockchain computing platform 74.

Similarly, the time oracle 70 may indicate a current time and cryptographically sign that current time with a private cryptographic key corresponding to public cryptographic key that serves to identify the entity operating the time oracle. Or some embodiments may use a time determined by peer nodes with the above-described consensus protocols, like in a provably fair launch trigger based on block height or coarse-grained (e.g., in 15 second quanta) consensus timestamps.

Similarly, the price oracle 72 may cryptographically sign price information of a specified cryptographic assets, like that the denominating the loan or that serving as collateral, or a ratio thereof. In some cases, the cryptographic signature may be made with a private cryptographic key corresponding to public cryptographic key with which the price oracle 72 is identified to the blockchain computing platform 74, the loan-servicer system 62, or both. Again, pricing information may be sent responsive to invocation of a registered callback function or responsive to a query sent by a smart contract or the loan-servicer system 62.

As mentioned above, some embodiments may include additional oracles for other information, examples include an interest rate oracle for variable interest rates, like LIBOR or SOFR. Other examples include information corresponding to various debt covenants, like in an amount of assets in a bank account, provided that appropriate permissions are granted by the account holder.

In some embodiments, the loan-servicer system 62 may include a web server 76, an API server 78, a controller 80, a loan instantiator 84, collateral monitor 86, and a payment monitor 82.

Servers 76 and 78 may communicate with different types of counterparts (or in some cases, their functionality may be merged into a single server, which is not to suggest that any other feature described is limiting). In some embodiments, the web server 76 may serve webpage content by which user interfaces are supplied to the borrower computing device 64 and the lender computing device 66 for rendering in web browsers executing thereon. In some embodiments, the web server 76 may further receive inputs conveyed via those web browsers back to the loan-servicer system 62. In some embodiments, the API server 78 may interface with a native application executing on user computing devices, like those of the borrower 64 or the lender 66. In some cases, API server 78, may also expose APIs by which the loan-servicer system 62 interfaces with the blockchain computing platform 74 or other services. In some embodiments, the server 76 and 78 are implemented as nonblocking servers each monitoring a different port via different network sockets (e.g., having different port numbers), with nonblocking operations being implemented with promises or other deferreds.

In some embodiments, the controller 80 may coordinate the operation of the other components of the loan-servicer system 62, in some cases effectuating some or all of the steps in FIGS. 2 and 3 and providing input and receiving output via one or both of the servers 76 and 78.

In some embodiments, the loan instantiator 84 may effectuate the creation of a secured (e.g., partially or fully secured) loan, for example, by accessing a loan template, configuring the loan template responsive to information received from the borrower and lender computing devices 64 and 66, and transforming the template into an instance of a smart contract with terms satisfying criteria of the borrower and of the lender. In some embodiments, lender criteria may be specified programmatically, for example, with rules, and a rules engine may populate the template, or in some cases, information to populate the template may be provided via manual entry by humans operating devices 64 and 66. Or in some cases, a loan schema specifies how the parties are to input a loan, and a document encoding loan parameters may be received from devices 64 or 66 in the schema, e.g., in a hierarchical data serialization format, like JavaScript™ object notation (JSON), extensible markup language (XML), yet another markup language (YAML), or the like.

In some embodiments, the loan instantiator is 84 may operate a peer node (a term that is consistent with nodes in both federated and non-federated architectures, e.g., some nodes may have different roles or authorities while still being "peer nodes") like those described below with reference to FIG. 5 and may create the instance of the smart contract on the blockchain computing platform 74 via that peer node. For instance, the smart contract may be created using an identifier corresponding to the public cryptographic key of the control wallet account or a public cryptographic key of the identity of the operator of the loan servicing system 62. In some cases, the smart contract may be associated with the identity of the entity operating the loan-servicer system 62 or the lender computing device 66, in some cases, drawing down an account of native cryptocurrency of the platform 74 of that entity to compensate peer nodes for creating and running the smart contract, e.g., consuming gas on Ethereum.

In some embodiments, the collateral monitor 86 may execute operations like those described above with reference to FIG. 3 relating to monitoring of the collateral. In some embodiments, these operations may be invoked asynchronously relative to other forms of updating state of the loan. For example, collateral may be checked hourly, while payments may be checked daily. In some embodiments, the collateral monitor 86 is configured to call an address of the smart contract on the blockchain computing platform 74 with parameters indicating that collateral is to be checked and any arguments related thereto.

Some embodiments include the payment monitor 82, which may perform the operations described above by which payments are verified and, in some cases, some forms of default are detected, for instance, those in which a payment has not been received by a threshold time. Again, in some embodiments, the payment monitor 82 may call an address of the smart contract of the loan to invoke corresponding functionality by which payment is verified. Or like the collateral monitor, some embodiments may implement these forms of monitoring off-chain, for example, in logic executed by the loan-servicer system 62, which may be external to the blockchain computing platform 74 (e.g., having a different address space and name space at the application layer and running in a different set of operating systems, in some cases, on different computing devices).

In some embodiments, the borrower computing device 64 and lender computing device 66 include an operating system 88 executing on one set of processors and a trusted execution environment 90 implemented with (e.g., executing on, or embodied by) another set of processors. The term "trusted" in "trusted execution environment" does not require any particular state of mind with regard to trust, but rather the phrase refers to a class of computing architectures that implement certain techniques to securely store information, even in the face of attacks yielding escalated privileges in an OS. In some embodiments, the trusted execution environment 90 executes on different processors from the operating system 88, and in some cases, those different sets of processors communicate via interrupts, with the processors executing the trusted execution environment 90 having a different physical memory address space than that accessible to the processors executing the operating system 88. Thus, in some cases, a different physical memory bus (e.g., a plurality of parallel conductive paths) may connect the processors executing the operating system 88 to memory than that connecting the processors executing the trusted execution environment 90 to a different body of memory. Such approaches are expected to impair or prevent certain attacks by which processes attempt to access information outside their address space, like buffer overflow attacks and row-hammer attacks.

In some embodiments, the operating system 88 may be the environment in which a native application 92 or a web browser 94 executes, and a user interface may be presented by which borrowers and lenders may interface with the loan-servicer system 62 therein. In some embodiments, as described below, these user interfaces may be part of a payment processor website or a native application into which operations of the loan-servicer system 62 are integrated.

In some embodiments, the native application 92 may communicate with the API server 78, and in some cases, the web browser 74 may communicate with the web server 76. In some cases, both applications 94 and 92 may communicate with both types of server 76 and 78.

Figure 5:
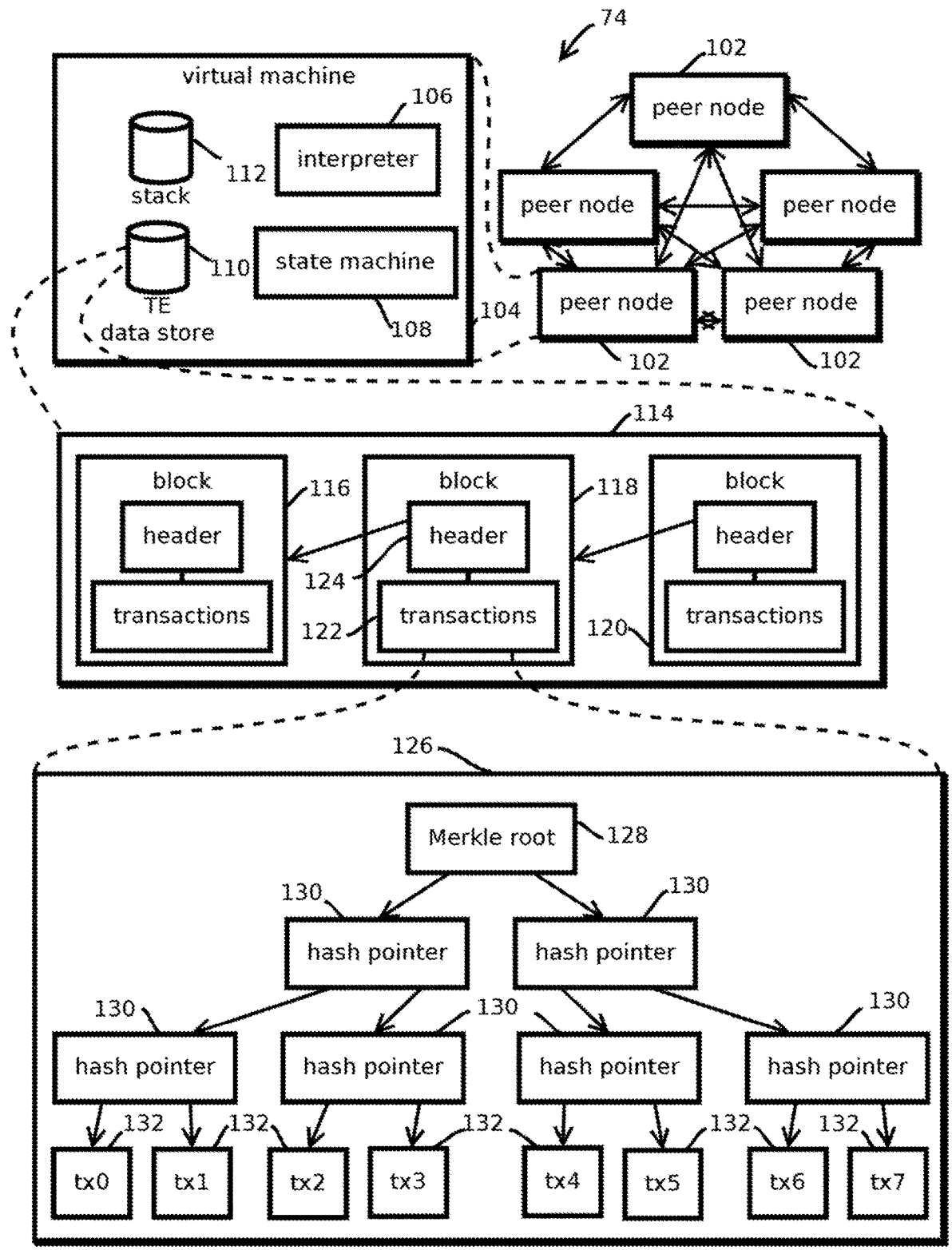
FIG. 5 is a block diagram of an example of a blockchain-based computing platform, in accordance with some embodiments.

FIG. 5 illustrates an example of the blockchain computing environment 74, which in some embodiments, may be an example of the distributed ledger 16 described above with reference to FIG. 1. In some embodiments, the blockchain computing environment 74 supports a programming language by which program state is persisted to a tamper-evident data store. In some cases, this programming language is Turing complete, or some embodiments may be non-Turing complete. As shown in FIG. 5, the blockchain computing platform 74 may be implemented on a network of peer computing nodes 102. In some embodiments, the network may be an application layer network implemented on lower-level networks, like those below the application layer in the Open Systems Interconnection model (OSI model). In some embodiments, the peer nodes may each have the same role, or in some embodiments, different peer nodes 102 may have elevated authority and privileges, for example, in certain federated architectures.

In some embodiments, each of the peer nodes may execute a peer client application, such as virtual machine 104. In some embodiments, the virtual machine 104 may shield those writing smart contracts from needing to contend with the particulars of the underlying physical computing architecture and the operating system, thereby allowing a smart contract to, for example, run on both x86 and ARM™ architectures, or within both Linux™ and Windows™ operating systems, in some cases. In some cases, each peer node may correspond to a different computing device, or in some cases, multiple peer nodes may execute on a single computing device, e.g., as different instances of the virtual machine 104. Reference to information being sent to or from addresses and the like should be understood as including scenarios where transmission is between logical structures, e.g., between smart contracts both in memory of a given peer node (and possibly several other, or all, peer nodes), without requiring transmission over a geographic distance between entities.

In some embodiments, the virtual machine 104 may include an interpreter 106, a state machine 108, a tamper-evident data store 110 (which may be an example of the above-described tamper-evident data structures), and a stack 112. In some embodiments, the interpreter may interpret source code, like Solidity, Java™, or Go into an intermediate representation, like bytecode of the virtual machine 104, for example at runtime or in advance. This may include parsing the source code, forming a concrete syntax tree (e.g., a parse tree) or an abstract syntax tree, and transforming the result (in some cases, with optimizations, like loop unrolling) into bytecode executable by the virtual machine 104. In some cases, interpreting may include inserting bytecode instructions by which an account of the entity invoking the smart contract has a native cryptocurrency debited from their account to pay those operating peer nodes for computation. The virtual machine may further include a program counter that increments through an ordered list of the bytecode instructions, jumping to other positions therein as indicated by branching logic therein in some cases. In some embodiments, such execution may cause state machine 108 to transition between various states, temporarily storing information in the stack 112 in, for example, a last-in-first-out data structure. In some embodiments, information, like program state of smart contracts and accounts in which cryptocurrency or other virtual cryptographic assets are held may be persisted to (e.g., stored in a manner that remains accessible across sessions) the tamper-evident data store 110, which in some embodiments may be a blockchain.

An example of a blockchain 114 is illustrated in FIG. 5. In some embodiments, the blockchain 114 may include a sequential list, like a skip list, of blocks connected by cryptographic hash pointers. A cryptographic hash pointer may specify another node in a graph, like another block in a blockchain, and contain a cryptographic hash of (some or all of) the content of that other node, in some cases, including cryptographic hash values of hash pointers from that node. Thus, a given block with a cryptographic hash pointer in a chain may have a cryptographic hash value therein based upon each proceeding block. In some embodiments, the chain may be initiated with a source of entropy, like a random seed value of greater than a threshold length.

In some embodiments, each block 116, 118, and 120 may include a header with the cryptographic hash pointer to the proceeding block and, for example, a block sequence, a timestamp of when it was created, and other block particulars in some cases. In some embodiments, each block 116, 118, and 120 may also include a value produced by a cryptographic accumulator upon processing a collection of transactions 122. Examples include a root of a Merkel tree, such as a radix tree.

FIG. 5 illustrates an example of a Merkel tree 126. In some embodiments, the Merkel tree 126 includes various types of directed acyclic graphs (like a trie, a radix tree, or a balanced binary tree) of cryptographic hash pointers reachable from a root value 128. The root may have a cryptographic hash value (or other one-way function output)

based upon the content of every single value in a tree data structure, thereby rendering all values in the tree tamper-evident. Further, the tree structure may expedite operations by which the absence of tampering is verified by constraining the number of hash values to be checked when verifying a given leaf node 132, e.g., a given leaf node 132 may be verifiable by checking less than half of the hash values in the tree. In some embodiments, the Merkel tree 126 may contain a plurality of hierarchical layers, with each layer including a plurality of nodes that have cryptographic hash pointers, and with each cryptographic hash pointers that is not a leaf node 132 pointing to two nodes in a lower level of the hierarchy (e.g., in a balanced binary tree implementation). Intermediate layers are reference with the element number 130, as shown in FIG. 5. Leaf nodes 132 may each include the information being rendered tamper-evident or cryptographic hashes thereof or other outputs of one-way functions. In some embodiments, the leaf nodes 132 may indicate transactions or account states. For example, the current owner of a unit of cryptocurrency may be determined by tracing transactions referenced in the leaf nodes to the minting of the cryptocurrency, or with a state of an account documented in a leaf node 132. In some embodiments, each transaction pertaining to a given unit of cryptocurrency may reference a proceeding transaction (e.g., by identifying a block and leaf node) involving that cryptocurrency, thereby forming a graph of transactions. Similarly, each reference updating the state of an account, for instance, indicating an amount of cryptocurrency in that account may reference a proceeding state of that account in a linked list.

A single Merkel tree 126 is shown for a block, but some embodiments may include multiple Merkel trees with multiple Merkel roots in each block. For example, some embodiments may have three, with each tree corresponding to a different type of data in the blockchain computing platform 74. In some embodiments, a given block may include a Merkel root for a transaction tree, such as a root of a radix tree of cryptographic hash pointers with transactions rendered tamper evident in leaf nodes. Some embodiments may include further a root of a radix tree of cryptographic hash pointers rendering updated state in leaf nodes tamper evident, for example, the root of a storage radix tree. Further, some embodiments may include a third root value of a radix tree of cryptographic hash pointers for receipts corresponding to acquisition and consumption of a native cryptocurrency consumed when executing operations on smart contracts or awarded for operating a peer node, like gas in Ethereum. In some embodiments, the transaction tree may reference receipts in which gas is consumed to run the corresponding transaction or vice versa and state in the state tree indicating changes in smart contract state or vice versa. Or some embodiments may be implemented without gas, for instance, using certain forms of Hyperledger.

Figure 6:
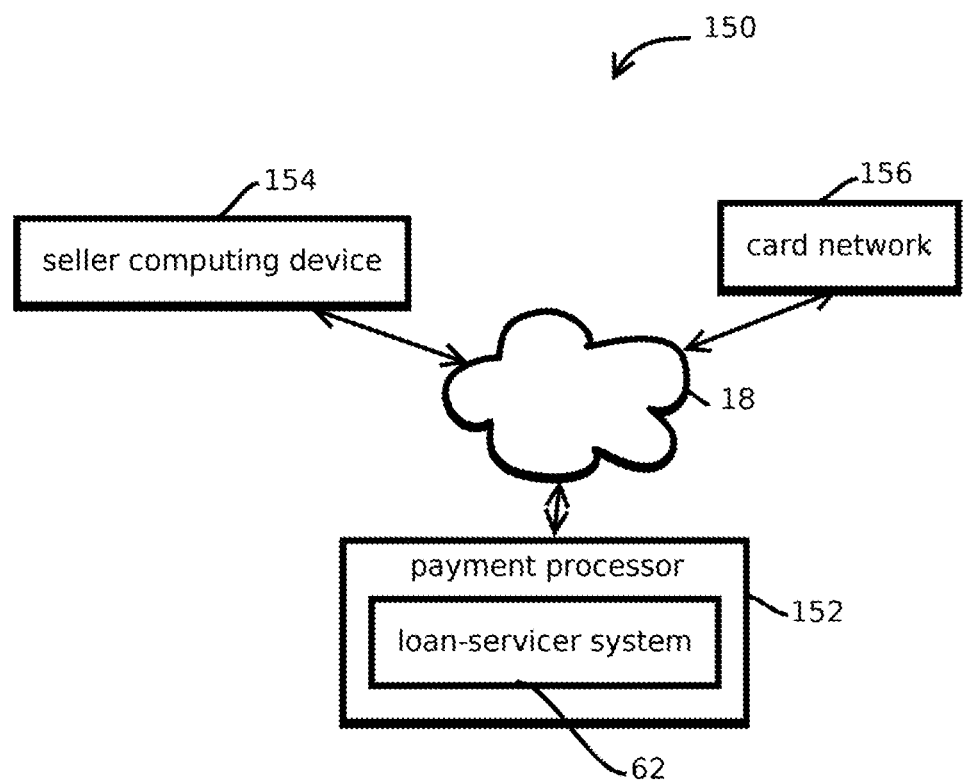
FIG. 6 is a block diagram of another computing environment in which cryptocurrency collateral may be managed, in accordance with some embodiments.

FIG. 6 illustrates an example computing environment 150 in which the loan-servicer systems described above may be implemented. In some embodiments, the above loan-servicer system 62 may be part of a payment processor system 152 in which credit card payments are processed in cooperation with a card network 156 on behalf of sellers operating seller computing device 154. A single card network 156 is shown, but embodiments are consistent with more, and a single seller computing device 154 shown, but embodiments are consistent with substantially more, for example, more than 10,000, more than a million, or more than 10 million seller computing devices interacting with the payment processor 152. In some embodiments, the payment processor may encode various forms of value of the seller, like obligations of the payment processor or the card holder to the seller, like accounts receivable in cryptocurrency, and in some cases, the payment processor may implement a loan secured by that cryptocurrency, with the loan-servicer system 62 interacting with the other components described above in some cases. In some cases, sellers may accumulate value in their account with the payment processor, like over the month before disbursement, and that value may be represented as a cryptocurrency which may serve as the collateral described above to support loans against those obligations. In another example, sellers may have their payments issued in the form of a cryptocurrency to a wallet account of the seller, and the loan-servicer system 62 may be configured to issue loans secured by collateral from those wallet accounts for sellers in need of debt financing.

In some cases, even with the pseudonymity afforded by certain forms of distributed ledger technology, borrowers and lenders may be sensitive to privacy concerns, particularly when the distributed ledger technology is a public implementation, like a public blockchain computing platform. A borrower may not wish others to know an aggregate amount of debt associated with their identity. To mitigate these concerns, some embodiments may implement homomorphic encryption techniques to maintain some or all of the logic of the lending agreement on-chain without revealing parameters of the lending agreement. For example, some of the above threshold determinations (like whether loan-to-value criteria are satisfied or whether a loan obligation has been satisfied) may be implemented by using various solution to Yao's Millionaires' problem to determine whether one encrypted amount is larger than another without having access to plaintext representations of the amounts, examples including Hsiao-Ying Lin and Wen-Guey Tzeng's protocol, Ioannidis and Ananth's protocol, and Hsiao-Ying Lin and Wen-Guey Tzeng's protocol based on ElGamal encryption. In some embodiments accrued interest and other multiplication operations may be calculated homomorphically as well, for example, by encrypting values to be multiplied (like an interest rate and loan balance) with ElGamal encryption, which supports homomorphic operations with respect to multiplication in some cases. Similarly, in some cases accrued payments may be summed with additively homomorphic ElGamal encryption performed on-chain without revealing plaintext parameters of the loan on a public implementation of distributed ledger technology.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

What is claimed is:

1. A tangible, non-transitory, machine-readable medium storing instructions that, when executed, effectuate operations to manage blockchain-based collateral securing debt, the operations comprising:
   receiving, by a payment service and from an application executing on a device associating with a user, a request to secure a debt with a security interest in cryptocurrency;
   obtaining, by the payment service, a value of collateral in cryptocurrency required to secure the debt;
   causing, by the payment service, a smart contract associated with a blockchain to designate a first amount of cryptographic tokens of the cryptocurrency as being controlled by the payment service to serve as collateral in a record of the blockchain to secure the debt by transferring the first amount of cryptographic tokens of the cryptocurrency from a first account of the user to a second account of the user, wherein:
      the first account of the user and the second account of the user each correspond to a different respective cryptographic key pair of an asymmetric encryption algorithm, each cryptographic key pair having a respective public cryptographic key and a respective private cryptographic key corresponding to the respective public cryptographic key,
      proof of access to a private cryptographic key is required to transfer assets from corresponding accounts, and
      the user is not provided access to the private cryptographic key of the second account of the user before at least some of the debt is repaid;
   determining, by the payment service and based on an update to state of the smart contract, that the first amount of cryptographic tokens designated as collateral in the blockchain has a value less than the value of collateral required to secure the debt;
   determining, by the payment service or the smart contract, a second amount of cryptocurrency required to exceed or match the value of collateral required to secure the debt;
   based on the determination, causing, by the payment service, the smart contract to designate, in the blockchain, the second amount of cryptographic tokens of the cryptocurrency as being controlled by the payment service to serve as collateral, so as to cause an adjustment of control of the second amount of cryptographic tokens by the payment service in the blockchain and counteract a decrease in value of the cryptocurrency; and
   in response to determining that at least some of the debt is repaid, providing, to the user, access to the private cryptographic key of the second account of the user.

2. The medium of claim 1, the operations comprising:
   creating, by the payment service and in response to receiving the request to secure the debt with the security interest in cryptocurrency, the second account of the user on the blockchain, wherein the second account is owned by the user and controlled by the payment service,
   wherein:
      designating the first amount of cryptographic tokens as being controlled by the payment service is performed by withholding access to the private cryptographic key of the second account from the user before the debt is paid.

3. The medium of claim 1, the operations comprising:
   repeatedly adjusting how much cryptocurrency is designated as collateral responsive to fluctuations in price of the cryptocurrency relative to another currency in which the debt is denominated; and
   paying down the loan, by the payment service, with funds from a credit card payment to the user that is processed by the payment service.

4. A tangible, non-transitory, machine-readable medium storing instructions that, when executed, effectuate operations comprising:
   obtaining, with one or more processors, parameters of a secured obligation, the parameters including an obligee, an obligor, an amount of an obligation of the obligor to the obligee denominated in a first unit of account, and a type of cryptographic asset to secure the obligation, wherein the type of cryptographic asset changes in value over time relative to the first unit of account; and
   causing, with one or more processors:
   a first set of the type of cryptographic asset to be placed under control of the obligee in a distributed computing platform by transferring the first set of the type of cryptographic asset from a first account of the obligor to a second account of the obligor by causing data with which the control is effectuated to be rendered tamper evident by a directed acyclic graph of cryptographic hash pointers, wherein:
      the first account of the obligor and the second account of the obligor each correspond to a different respective cryptographic key pair of an asymmetric encryption algorithm, each cryptographic key pair having a respective public cryptographic key and a respective private cryptographic key corresponding to the respective public cryptographic key,
      the distributed computing platform requires account holders to demonstrate proof of access to private cryptographic keys to transfer assets from corresponding accounts, and
      the obligor is not provided access to the private cryptographic key of the second account of the obligor before at least some of the secured obligation is satisfied;
   after the first set of the type of cryptographic asset is placed under control of the obligee, an updated value of the first set of the type of cryptographic asset to be obtained;

a determination to be made, based on the updated value, that the first set of the type of cryptographic asset has insufficient value to secure the obligation; and responsive to the determination, a second set of the type of cryptographic asset to be placed under control of the obligee in the distributed computing platform by transferring the second set of the type of cryptographic asset from a first account of the obligor to the second account of the obligor by causing data with which the control of the second set is effectuated to be rendered tamper evident by the directed acyclic graph of cryptographic hash pointers.

5. The medium of claim 4, wherein:

obtaining parameters comprises receiving a request to create a loan;

the parameters are loan parameters;

the type of cryptographic asset is cryptocurrency that is a second unit of account; and the first unit of account is a government-issued currency.

6. The medium of claim 4, wherein:

causing the first set of the type of cryptographic asset to be placed under control of the obligee comprises calling a program executed by the distributed computing platform;

the distributed computing platform is hosted by a plurality of different computing devices; and at least a plurality of the plurality of different computing devices redundantly execute the program responsive to the call and determine a result of executing the program by selecting among outcomes of executing the program produced by different computing devices with a consensus protocol.

7. The medium of claim 4, the operations comprising:

creating the second account of the obligor in the distributed computing platform, wherein the private cryptographic key of the second account comprises a knowledge-factor access credential and the public cryptographic key comprises an account address for the second account.

8. The medium of claim 7, wherein:

transferring is performed by operation of a Byzantine fault-tolerant script executed by the distributed computing platform;

creating the account is performed before invoking the Byzantine fault-tolerant script; and the Byzantine fault-tolerant script includes the account address; and code and state of the Byzantine fault-tolerant script is rendered tamper-evident by the directed acyclic graph of cryptographic hash pointers.

9. The medium of claim 8, wherein:

the Byzantine fault-tolerant script also has an application-layer address in the same address space as the account address; and the Byzantine fault-tolerant script executes in virtual machines of peer nodes of an application-layer network created by the distributed computing platform.

10. The medium of claim 4, wherein:

the type of cryptographic asset is a non-fungible cryptographic token;

parameters of the secured obligation identify an instance of the non-fungible cryptographic token with an identifier that distinguishes the instance of the non-fungible cryptographic token from other instances of the non-fungible cryptographic token; and causing the first set of the type of cryptographic asset to be placed under control of the obligee comprises selecting the identified instance of the non-fungible cryptographic token to be placed under control of the obligee from among other instances of the non-fungible cryptographic token in an account of the obligor in the distributed computing platform.

11. The medium of claim 4, wherein obtaining the updated value of the first set of the type of cryptographic asset comprises:

querying a price-oracle application program interface (API) exposed by a cryptocurrency exchange;

receiving a cryptographically signed price from the price-oracle API; and verifying the cryptographically signed price by decrypting a ciphertext encoding the price or a hash digest thereof from the price-oracle API with a public cryptographic key of the price-oracle API.

12. The medium of claim 4, wherein determining that the first set of the type of cryptographic asset has insufficient value to secure the obligation comprises:

determining a loan balance based on accrued interest and payments;

determining a product of the value and a count of members of the first set of the type of cryptographic asset; and determining that a ratio based on the product and the loan balance satisfies a threshold criterion.

13. The medium of claim 4, the operations comprising:

encoding the obligation in a smart contract;

deploying the smart contract to the distributed computing platform, the distributed computing platform being a decentralized computing platform, and deploying rendering code of the smart contract immutable;

determining, with the smart contract, that the obligation is met; and in response to determining the obligation is met, transferring, with the smart contract, control of the first and second sets of the type of cryptographic asset to the obligor.

14. The medium of claim 4, the operations comprising:

determining that the obligor has defaulted on the obligation; and in response to determining that the obligor has defaulted, classifying, in a record corresponding to the obligation in memory, the first set of the type of cryptographic asset as being owned by the obligee rather than the obligor.

15. The medium of claim 4, the operations comprising:

encoding the obligation in a smart contract;

deploying the smart contract to the distributed computing platform; and sending the deployed smart contract a message cryptographically signed by the obligee, the message indicating consent to forbearance and causing, upon receipt of a cryptographically-signed message from the obligor, the smart contract to be referenced by another smart contract that supersedes the smart contract and implements revised parameters of a revised obligation.

16. The medium of claim 4, the operations comprising:

causing steps for servicing a loan with homomorphic encryption.

17. The medium of claim 4, the operations comprising:

repeatedly determining whether the first and second sets of the type of cryptographic asset have greater than a threshold value.

18. The medium of claim 4, the operations comprising:
in response to determining that at least some of the secured obligation is satisfied, providing, to the obligor, access to the private cryptographic key of the second account.

19. The medium of claim 4, wherein balances of the first account of the obligor and the second account of the obligor are documented with tamper-evident records of the directed acyclic graph of cryptographic hash pointers.

20. The medium of claim 4, wherein the distributed computing platform is a decentralized computing platform.

* * * * *